(12) United States Patent
Tanabe et al.

(10) Patent No.: US 9,008,987 B2
(45) Date of Patent: Apr. 14, 2015

(54) COMPACT ELECTRONIC DEVICE WITH BUILT-IN INCLINATION SENSOR AND CORRECTION METHOD

(75) Inventors: Shigeki Tanabe, Kanagawa (JP); Junya Yano, Kanagawa (JP); Yuuya Hirose, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 828 days.

(21) Appl. No.: 12/920,051

(22) PCT Filed: Feb. 27, 2009

(86) PCT No.: PCT/JP2009/053671
§ 371 (c)(1),
(2), (4) Date: Sep. 22, 2010

(87) PCT Pub. No.: WO2009/107774
PCT Pub. Date: Sep. 3, 2009

(65) Prior Publication Data
US 2011/0004439 A1     Jan. 6, 2011

(30) Foreign Application Priority Data

Feb. 28, 2008   (JP) ................................. 2008-047327

(51) Int. Cl.
| | |
|---|---|
| *G01C 9/00* | (2006.01) |
| *G01P 15/08* | (2006.01) |
| *G01C 9/06* | (2006.01) |
| *G01C 25/00* | (2006.01) |
| *G01P 15/18* | (2013.01) |

(Continued)

(52) U.S. Cl.
CPC . *G01P 15/08* (2013.01); *G01C 9/06* (2013.01); *G01C 25/005* (2013.01); *G01P 15/18* (2013.01); *G01P 21/00* (2013.01); *G06F 1/1626* (2013.01); *H04M 1/0214* (2013.01); *H04M 2250/12* (2013.01); *H04M 2250/16* (2013.01)

(58) Field of Classification Search
USPC .................... 702/92–93, 104, 141, 85; 33/356
See application file for complete search history.

(56) References Cited

U.S. PATENT DOCUMENTS

| | | | |
|---|---|---|---|
| 2002/0023362 A1* | 2/2002 | Kato | ............................... 33/356 |
| 2006/0146009 A1 | 7/2006 | Syrbe et al. | |

(Continued)

FOREIGN PATENT DOCUMENTS

| | | |
|---|---|---|
| EP | 1 336 949 A1 | 8/2003 |
| EP | 1 806 643 A1 | 7/2007 |

(Continued)

OTHER PUBLICATIONS

Packan et al., Thrust Measurement with the ONERA Micronewton Balance, IEPC-2009-185, Sep. 2009.*

(Continued)

*Primary Examiner* — John Breene
*Assistant Examiner* — Hien Vo
(74) *Attorney, Agent, or Firm* — Hoffmann & Baron, LLP

(57) ABSTRACT

An electronic device is provided with an inclination sensor for computing inclination, a control unit which conducts predetermined control based on a value computed by the inclination sensor, a case which has the inclination sensor and the control unit therein, and a suspension portion for suspending the case, and the control unit controls correction of the reference value of the inclination sensor based on a state where the case is suspended by the suspension portion and still.

14 Claims, 9 Drawing Sheets

(51) Int. Cl.
*G01P 21/00* (2006.01)
*G06F 1/16* (2006.01)
*H04M 1/02* (2006.01)

(56) References Cited

U.S. PATENT DOCUMENTS

| | | |
|---|---|---|
| 2006/0185182 A1 | 8/2006 | Sato et al. |
| 2006/0247847 A1* | 11/2006 | Carter et al. .................. 701/200 |
| 2009/0088204 A1* | 4/2009 | Culbert et al. ............. 455/556.1 |
| 2011/0069007 A1* | 3/2011 | Baxter et al. .................. 345/158 |

FOREIGN PATENT DOCUMENTS

| | | |
|---|---|---|
| JP | S-49-107264 A | 10/1974 |
| JP | 2004-093552 A | 3/2004 |
| JP | 2006-139537 A | 6/2006 |
| JP | 2006-194725 A | 7/2006 |
| JP | 2006-234460 A | 9/2006 |

OTHER PUBLICATIONS

Supplementary European Search Report issued to European Application No. 09715955.2, mailed Apr. 5, 2011.

* cited by examiner

|  | ACCELERATION DATA MEASURED AFTER BEING MOUNTED TO SUBSTRATE | ACCELERATION IN LEFT COLUMN IS CONVERTED INTO INCLINATION ANGLE |
|---|---|---|
| AMOUNT OF DEVIATION IN X-DIRECTION | −97.2〜54 mg | −5〜+3 DEGREES |
| AMOUNT OF DEVIATION IN Y-DIRECTION | −61.2〜64.8 mg | ±3.5 DEGREES |
| AMOUNT OF DEVIATION IN Z-DIRECTION | −180〜36 mg | −10〜+2 DEGREES |

COMPACT ELECTRONIC DEVICE WITH BUILT-IN INCLINATION SENSOR AND CORRECTION METHOD

CROSS-REFERENCE TO RELATED APPLICATIONS

This application is the National Stage of International Application No. PCT/JP2009/053671 filed on Feb. 27, 2009, which claims the benefit of Japanese Application No. 2008-047327, filed Feb. 28, 2008, the contents of which is incorporated by reference herein.

TECHNICAL FIELD

The present invention relates to an electronic device with a built-in inclination sensor that performs correction of a reference value of the inclination sensor, and a correction method.

BACKGROUND ART

As shown in FIG. 10, in a three-axis acceleration sensor, a reference direction is determined in advance for each axis: an x-axis, a y-axis and a z-axis. Here, generally, a reflow process is employed when mounting the three-axis acceleration sensor to a circuit board; however, overheating occurring in this reflow step results in deviation (deviation of the 0 g level) in the reference directions.

Here, FIG. 11 shows amounts of deviation of the 0 g level occurring when the three axis acceleration sensor was mounted to the circuit board by the reflow process. Although FIG. 11 is an example, deviation of −97.2 to 54 mg (−5 to +3 degrees) occurred in the x-axis direction; deviation of −61.2 to 64.8 mg (±3.5 degrees) occurred in the y-axis direction; and deviation of −180 to 36 mg (−10 to +2 degrees) occurred in the z-axis direction. Furthermore, the 0 g level of the three-axis acceleration sensor may deviate with time, temperature change in an environment for actual use, etc.

Accordingly, in the three-axis acceleration sensor, processing (calibration processing) to correct (calibrate) this amount of deviation is performed after the reflow process when mounted to the circuit board. By performing this calibration processing, the reference direction of each axis, which has deviated due to causes such as the reflow process, is recovered (for example, see Patent Document 1).

Moreover, in such a calibration method, in general, correction is performed such that any two directions of the x-axis direction, the y-axis direction and the z-axis direction are at the 0 g level. It should be noted that, in a case in which accurate calibration is performed, as shown in FIG. 12, the body is placed so as to be oriented in one direction, and calibration is performed for a first axial direction (x-axis direction in FIG. 12(A)) and a second axial direction (y-axis direction in FIG. 12(A)); and thereafter, the body is placed so as to be oriented in another direction, and calibration is performed for the first axial direction (x-axis direction in FIG. 12(A)) and a third axial direction (z-axis direction in FIG. 12(A)), thereby correcting deviation of the reference directions in all three axes.

Patent Document 1: Japanese Unexamined Patent Application Publication No. 2004-93552

DISCLOSURE OF THE INVENTION

Problems to be Solved by the Invention

Incidentally, calibration is performed by placing a circuit board, to which a three-axis acceleration sensor is mounted, or an electronic device including the circuit board on a horizontal plane; however, this horizontal plane needs to be a plane that is exactly horizontal relative to gravity. The reason is that it is difficult to perform accurate calibration if the horizontal plane is inclined relative to gravity. Therefore, when calibration is performed, a tool and jig that can secure an accurate horizontal plane relative to gravity are required separately.

It is difficult for a general user to easily perform calibration using such a tool and jig. Therefore, after electronic devices including a three-axis acceleration sensor have been distributed in the market, it may be considered difficult to perform accurate calibration unless such an electronic device is brought into a manufacturer.

In addition, even if calibration of the three-axis acceleration sensor is performed before factory shipment, in a case in which the 0 g level deviated with time or temperature change after being distributed in the market, it would be difficult for a user without a tool and jig as described above to perform accurate calibration.

It should be noted that calibration is conventionally performed when the three-axis acceleration sensor was mounted to the circuit board, and not performed after being assembled as an electronic device and distributed in the market.

The present invention has been made in view of the aforementioned problems, and an object thereof is to provide an electronic device with a built-in inclination sensor and a correction method, with which a user oneself can easily perform accurate calibration.

Means for Solving the Problems

In order to solve the above problems, the electronic device with a built-in inclination sensor according to the present invention is characterized by including: an inclination sensor that calculates inclination; a control unit that performs predetermined control based on a value calculated by the inclination sensor; a case that includes the inclination sensor and the control unit inside thereof; and a suspension portion that suspends the case, in which the control unit performs correction control of a reference value of the inclination sensor, based on a state in which the case is suspended by way of the suspension portion and has come to rest.

Moreover, in the electronic device with a built-in inclination sensor, when the case is suspended by way of the suspension portion, it is preferable that the control unit performs correction control of a reference value of the inclination sensor, based on an inclination angle of the case relative to a vertical direction in a state of being suspended and having come to rest.

In addition, it is preferable that the electronic device with a built-in inclination sensor further includes an operation unit; and a display unit that displays predetermined information, and when an operation to perform correction control of a reference value of the inclination sensor is performed via the operation unit, the control unit performs control such that the display unit displays information that prompts to suspend the body by way of the suspension portion.

Furthermore, in the electronic device with a built-in inclination sensor, when an operation to perform the correction control is performed via the operation unit, it is preferable that the control unit performs the correction control after a predetermined period of time has elapsed since the operation.

Moreover, in the electronic device with a built-in inclination sensor, when the case is suspended by way of the suspension portion, it is preferable that the control unit determines whether an inclination angle related to a value calculated by the inclination sensor coincides with a predetermined inclination angle, and in a case of having determined not to coincide, calculates an amount of deviation from the predetermined inclination angle, and performs the correction control based the amount of deviation.

In addition, it is preferable that the electronic device with a built-in inclination sensor further includes an operation unit; and a display unit that displays information, and when an operation to perform correction control of a reference value of the inclination sensor is performed via the operation unit, the control unit performs a predetermined calculation regarding the correction control, performs control such that the display unit displays a screen for confirming whether to perform the correction control based on a result of the calculation, and accepts a confirmation operation via the operation unit, and determines whether to perform the correction control based on the result of the calculation depending on a result thus accepted.

Furthermore, in the electronic device with a built-in inclination sensor, in the case of having determined not to coincide, it is preferable that the control unit calculates an amount of deviation from the predetermined inclination angle, calculates an average value of the amount of deviation and a plurality of amounts of deviation calculated previously, and performs the correction control based on the average value.

Moreover, in the electronic device with a built-in inclination sensor, it is preferable that the case includes a first case and a second case that are connected so as to be openable and closable via a connecting portion, and the control unit performs the correction control taking into account whether the body is in an opened state or a closed state.

In addition, in the electronic device with a built-in inclination sensor, it is preferable that the case includes a first case and a second case that are connected so as to be openable and closable via a connecting portion, and when an operation to command execution of correction control of a reference value of the inclination sensor is performed via the operation unit, the control unit performs control such that the display unit displays information that prompts to suspend the body in any one of an opened state or a closed state.

Furthermore, in the electronic device with a built-in inclination sensor, it is preferable that a strap is attached as a suspension member to the suspension portion.

Moreover, in the electronic device with a built-in inclination sensor, it is preferable that the case further includes a memory card mounting portion to which a memory card is removably mounted, and the control unit performs the correction control taking into account of the existence of a memory card mounted to the memory card mounting portion.

In addition, in the electronic device with a built-in inclination sensor, it is preferable that the inclination sensor is configured so as to calculate inclination by detecting acceleration, and the control unit monitors acceleration detected by the inclination sensor and an inclination angle that is calculated, and performs the correction control in a case of having determined that the acceleration detected by the inclination sensor is in a state that does not fluctuate, and that the inclination angle that is calculated falls within a predetermined angle range with a vertical direction as a reference.

Furthermore, in the electronic device with a built-in inclination sensor, it is preferable that the inclination sensor is configured so as to calculate inclination by detecting acceleration, and that the control unit performs the correction control or processing related to the correction control in a state in which acceleration detected by the inclination sensor does not fluctuate.

In order to solve the above problems, the electronic device with a built-in inclination sensor according to the present invention is characterized by including: an inclination sensor that calculates inclination; a case that incorporates the inclination sensor; and a communication cable part that outputs a signal related to a value calculated by the inclination sensor to an external device, in which correction control of a reference value is performed in the inclination sensor, based on a state in which the case is suspended by way of the communication cable part and has come to rest.

In order to solve the above problems, a correction method according to the present invention is a method of correcting a reference value of an inclination sensor in an electronic device with a built-in inclination sensor, including the inclination sensor and a case accommodating the inclination sensor inside thereof, and the method is characterized by including: an inclination detecting step of detecting inclination by way of the inclination sensor; and a correcting step of performing correction control of a reference value of the inclination sensor, based on a state in which the case is suspended by way of the suspension portion and has come to rest.

Effects of the Invention

According to the present invention, the user oneself can easily perform accurate calibration.

Figure 1:
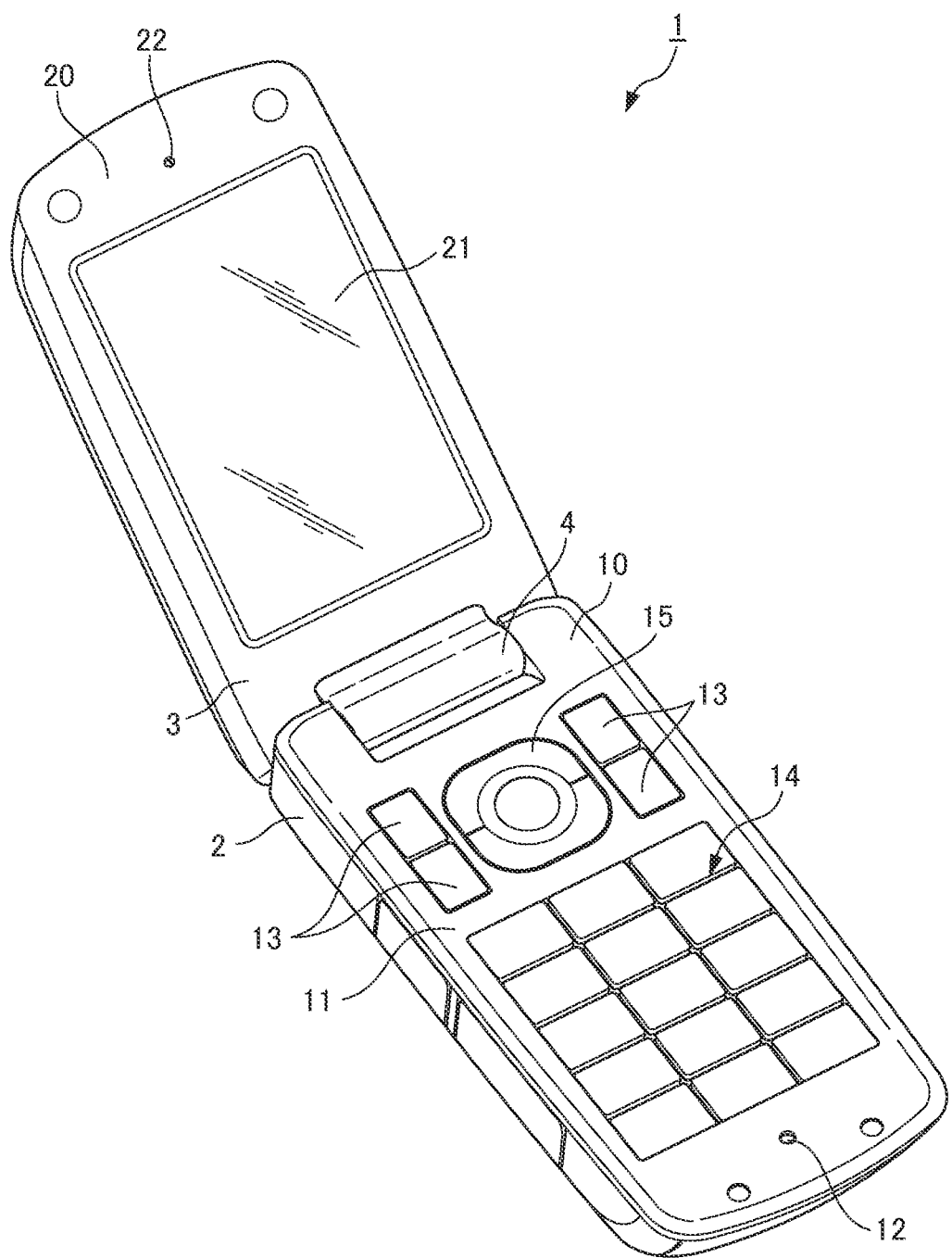
FIG. 1 is a perspective view showing an appearance of a cellular telephone device according to the present invention.

EXPLANATION OF REFERENCE NUMERALS 1 cellular telephone device
31 attachment portion (suspension portion)
32 suspension member
45 acceleration sensor (inclination sensor)
49 CPU (control unit)
60 pole
100 controller
101 case
102 communication cable part

PREFERRED MODE FOR CARRYING OUT THE INVENTION

A description is provided hereinafter regarding an embodiment of the present invention. FIG. 1 is a perspective view showing an appearance of a cellular telephone device 1 as an example of a small-sized electronic device with a built-in inclination sensor according to the present invention. It should be noted that, although FIG. 1 shows a so-called flip-type cellular telephone device, the small-sized electronic device with a built-in inclination sensor according to the present invention is not limited thereto. For example, it may be a slider type in which one of the bodies slides to one direction in a state in which the bodies are mutually superimposed; a rotating (turning) type in which one of the bodies is rotated around an axis line along the direction of superimposition; and a type (straight type) in which an operation unit and a display unit are disposed in one case without having a connecting portion.

The cellular telephone device 1 is configured to include an operation unit side case 2 and a display unit side case 3. The operation unit side case 2 is configured to include, on a front face portion 10 thereof, an operation unit 11 and a microphone 12 to which sound, which a user of the cellular telephone device 1 produces during a phone call, is input. The operation unit 11 is configured with: feature setting operation buttons 13 for operating various settings and various features such as a telephone number directory feature and a mail feature; input operation buttons 14 for inputting digits of a telephone number and characters for mail, and a selection operation button 15 that performs selection of the various operations and scrolling.

Moreover, the display unit side case 3 is configured to include, on a front face portion 20, an LCD (Liquid Crystal Display) display unit 21 for displaying a variety of information, and a speaker 22 for outputting sound of the other party of the conversation.

In addition, an upper end portion of the operation unit side case 2 and a lower end portion of the display unit side case 3 are connected via a hinge mechanism 4. Furthermore, by relatively pivoting the operation unit side case 2 and the display unit side case 3, connected via the hinge mechanism 4, the cellular telephone device 1 can be in a state where the operation unit side case 2 and the display unit side case 3 are apart from each other (opened state), and in a state where the operation unit side case 2 and the display unit side case 3 are folded (folded state).

Figure 2:
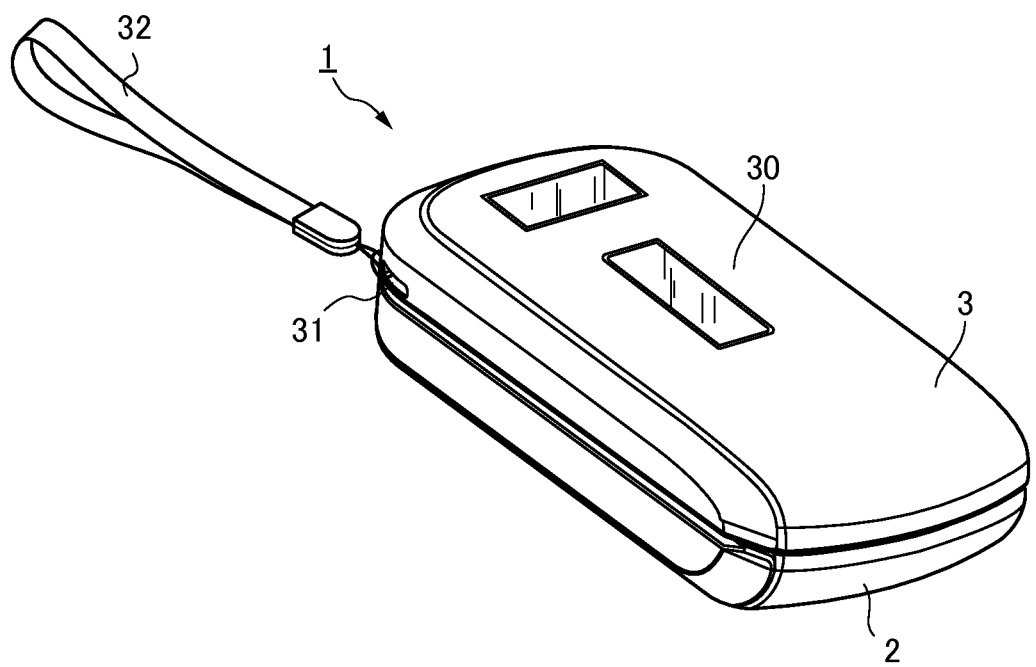
FIG. 2 is a perspective view showing a state in which the cellular telephone device according to the present invention is folded.

FIG. 2 is a perspective view showing a state in which the cellular telephone device 1 is folded. The operation unit side case 2 includes, on its outer planar portion, a sub LCD display unit 30 that displays a clock, incoming notice of mail, etc. Moreover, an attachment portion 31 (suspension portion), to which a suspension member 32 (a hand strap or a neck strap shaped like a cord) is attached when suspending the case, is formed at a corner of the display unit side case 3. It should be noted that, although the attachment portion 31 is formed at the corner of the display unit side case 3 in the present embodiment, it may be formed anywhere without being limited to a corner, and may be formed on the operation unit side case 2. Incidentally, although an LCD is shown as an example of the display unit in the foregoing, naturally the display unit may be configured by a device other than an LCD, such as an OLED (organic light-emitting diode).

Figure 3:
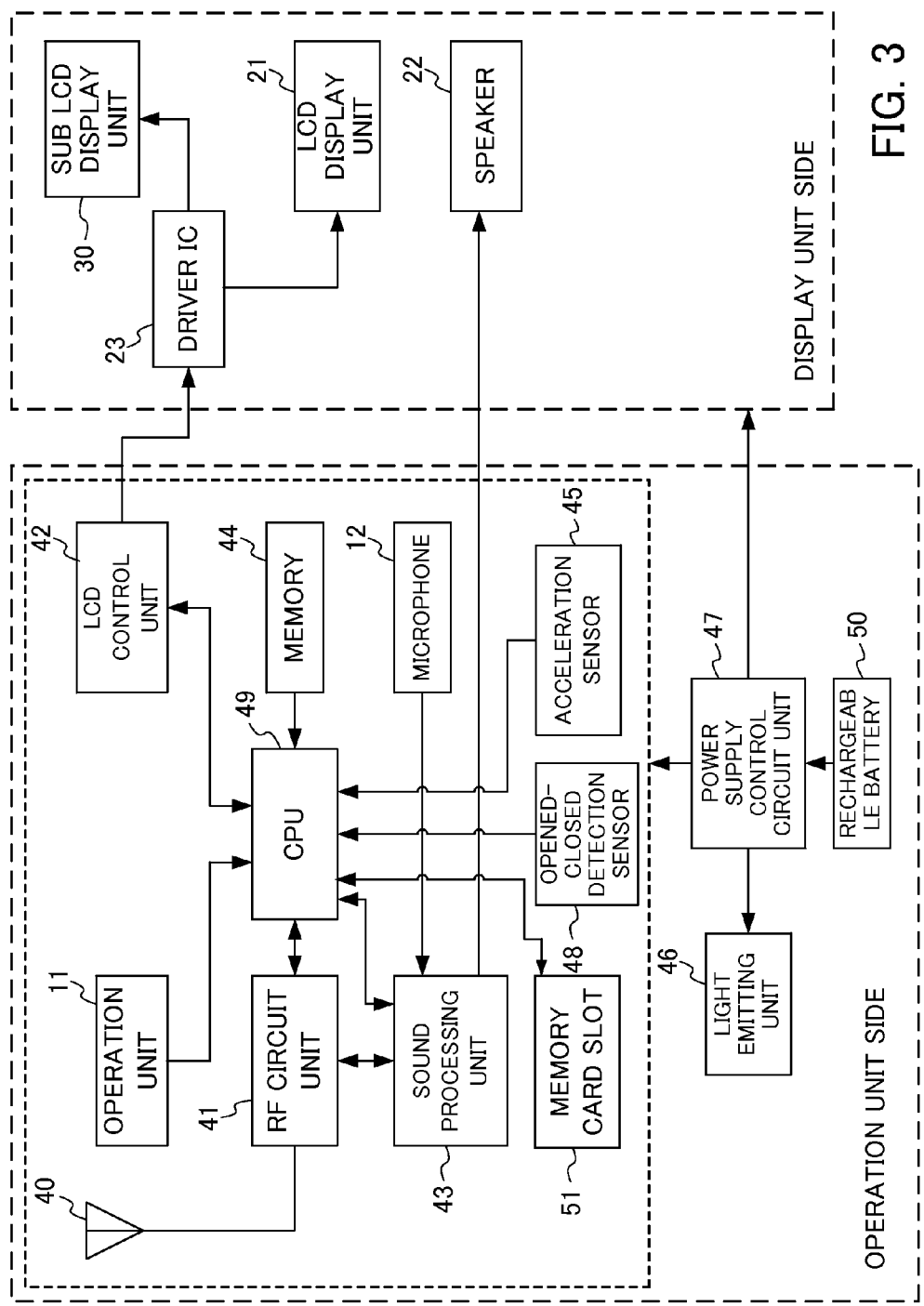
FIG. 3 is a block diagram showing functions of the cellular telephone device according to the present invention.

FIG. 3 is a functional block diagram showing functions of the cellular telephone device 1. As shown in FIG. 3, in the cellular telephone device 1, the operation unit side case 2 includes an operation unit 11, a microphone 12, a main antenna 40, an RF circuit unit 41, an LCD control unit 42, a sound processing unit 43, memory 44, an acceleration sensor 45 (inclination sensor), a light emitting unit 46, a power supply control circuit unit 47, an opened-closed detection sensor 48, a CPU 49 (control unit), and a rechargeable battery 50; and the display unit side case 3 includes an LCD display unit 21, a speaker 22, a driver IC 23, and a sub LCD display unit 30.

The main antenna 40 communicates with external devices by way of a predetermined usable frequency band (for example, 800 MHz). It should be noted that, although the predetermined usable frequency band is set to 800 MHz in the present embodiment, other frequency bands may also be used. In addition, the main antenna 40 can be configured as a so-called dual band compatible antenna that can be compatible with another usable frequency band (for example, 2 GHz) in addition to the predetermined usable frequency band.

The RF circuit unit 41 performs demodulation processing on a signal received via the main antenna 40, transmits the processed signal to the CPU 49, performs modulation processing on a signal received from the CPU 49, and transmits the processed signal to an external device (base station) via the main antenna 40. Furthermore, intensity of a signal received via the main antenna 40 is meanwhile notified to the CPU 49.

The LCD control unit 42 performs predetermined image processing in accordance with control by the CPU 49, and outputs the processed image data to the driver IC 23. The driver IC 23 stores the image data, which is transmitted from the LCD control unit 42, in frame memory so as to be output to the LCD display unit 21 or the sub LCD display unit 30 at predetermined timing.

The sound processing unit 43 performs predetermined sound processing in accordance with control by the CPU 49 for a signal transmitted from the RF circuit unit 41, and outputs the processed signal to the speaker 22. The speaker 22 externally outputs the signal that is transmitted from the sound processing unit 43.

Moreover, the sound processing unit 43 processes a signal, which is input from the microphone 12, in accordance with control by the CPU 49, and outputs the processed signal to the RF circuit unit 41. The RF circuit unit 41 performs predetermined processing on the signal transmitted from the sound processing unit 43, and outputs the processed signal to the main antenna 40.

The memory 44 includes, for example, working memory, and is utilized for arithmetic processing by the CPU 49. It should be noted that the memory 44 may also serve as detachable external memory.

The acceleration sensor 45 detects acceleration applied to the cellular telephone device 1, and outputs a detection result to the CPU 49.

The acceleration sensor 45 is of a three-axis (three-dimension) type for detecting acceleration in an X-axis direction, a Y-axis direction and a Z-axis direction, and measures acceleration (a) based on a force (F) applied from outside of the cellular telephone device 1 and mass (m) of the cellular telephone device 1 (acceleration (a)=force (F)/mass (m)).

In addition, the acceleration sensor 45 obtains acceleration for each axis, for example, by measuring a force applied to the cellular telephone device 1 by way of a piezoelectric element, and converts the acceleration into numeric data to be buffered. The CPU 49 then reads acceleration data that has been periodically buffered. It should be noted that the acceleration sensor 45 is not limited to the piezoelectric element (piezoelectric type), and it may be configured as an MEMS (Micro Electro Mechanical Systems) type utilizing a piezoresistance type, an electrostatic capacitance type, a heat detecting type, or the like, a servo type that moves a movable coil that is returned by a feedback electric current, a strain gauge type that measures strain occurring due to acceleration by way of a strain gauge, etc.

The light emitting unit 46 is configured so as to emit light based on a voltage supplied from the power supply control circuit unit 47, and is configured with, for example, an LED (light emitting diode). It should be noted that, although only a single light emitting unit 46 is shown in FIG. 3 for simplicity, a plurality of different light emitting units are actually provided in predetermined locations of the case.

Here, a description is provided regarding correction control when performing calibration of the acceleration sensor 45 by way of the CPU 49. Furthermore, the calibration may be executed with a predetermined operation having been performed by a user as a trigger (manual calibration), and may be executed with the case having settled within a predetermined angle range and having come to rest as a trigger (automatic calibration).

When the suspension member 32 is attached to the attachment portion 31, and the case (cellular telephone device 1) is suspended, the CPU 49 performs correction control of a reference value of the acceleration sensor 45, based on the state of being suspended and having come to rest. It should be noted that the CPU 49 is monitoring fluctuation of a detection value of the acceleration sensor 45, and when detecting only 1 g in a constant direction, and detecting a state in which fluctuation of acceleration to other directions is not occurring, the CPU 49 determines that the case is in a resting state (to be described later in detail).

Moreover, according to the present invention, since an accurate direction relative to gravity can be easily established when performing calibration of the acceleration sensor 45, for example, in a case in which deviation has occurred in a 0 g level (reference value) of the acceleration sensor 45 while the user is using the cellular telephone device 1, accurate calibration (automatic calibration in this case) can be performed for any number of times in accordance with operations by the user oneself.

In addition, when the suspension member 32 is attached to the attachment portion 31, and the case is suspended from a fixed portion (a pole 60 of a house, etc.) by way of the suspension member 32, and after a predetermined operation has been performed by the user in a case of manual calibration, or after a predetermined time elapsed in a case of automatic calibration, it is preferable that the CPU 49 performs correction control of a reference value of the acceleration sensor 45, based on a difference of an inclination angle of the case in the state of being suspended and having come to rest and an angle of a vertical direction.

According to such a configuration, since calibration of the acceleration sensor 45 is performed using the angle of the vertical direction that can be easily and accurately obtained with the present invention, accurate calibration can be performed with a simple method.

Furthermore, as described above, the cellular telephone device 1 includes the operation unit 11 (operation unit) that performs an operation to command execution of correction control of a reference value of the acceleration sensor 45, and the LCD display unit 21 (display unit) that displays predetermined information. In such a configuration, when an operation to command execution of correction control of a reference value of the acceleration sensor 45 (a predetermined operation by the user in manual calibration) is performed by way of the operation unit 11, it is preferable that the CPU 49 controls the LCD display unit 21 to display information that prompts to attach the suspension member 32 to the attachment portion 31 so as to suspend the case. It should be noted that, in such a support display, the CPU 49 controls the LCD display unit 21 to display in a case in which the case is in the opened state, and controls the sub LCD display unit 30 to display in a case in which the case is in the closed state.

According to such a configuration, in the present invention, in the manual calibration, since an operating procedure of calibration is explained on a display screen of the LCD display unit 21, the operability for the user can be improved. It should be noted that the explanation of the operating procedure regarding calibration is not limited to the display behavior of the LCD display unit 21, and may be performed by way of a voice output behavior of the speaker 22.

Moreover, in the manual calibration, when the user has performed an operation to command execution of correction control of a reference value of the acceleration sensor 45, it is preferable that the CPU 49 performs correction control after a predetermined period of time has elapsed from the operation.

According to such a configuration, in the present invention, in the manual calibration, since calibration is not performed until a predetermined period of time (for example, several seconds) has elapsed after a predetermined operation by the user was performed, calibration is performed after the suspension member 32 has been attached to the attachment portion 31 and the case has been suspended and has come to rest; therefore, calibration can be performed by excluding a state of being held by the user and a state of jiggling immediately after being suspended.

In addition, in the automatic calibration, when the suspension member 32 is attached to the attachment portion 31, and the case is suspended, it is preferable that the CPU 49 determines whether an inclination angle according to a value calculated by the acceleration sensor 45 coincides with a predetermined inclination angle (reference value), and in a case in which the CPU 49 has determined that it does not coincide therewith, it is preferable that the CPU 49 calculates an amount of deviation from the predetermined inclination angle, and performs correction control based on the amount of deviation.

According to such a configuration, in the present invention, in a state in which the suspension member 32 is attached to the attachment portion 31, and the case is suspended, calibration can be automatically performed based on whether an inclination angle according to a value calculated by the acceleration sensor 45 coincides with a reference value.

Furthermore, in the manual calibration, when the user has performed an operation to command execution of correction control of a reference value of the acceleration sensor 45, it is preferable that the CPU 49 performs predetermined calculation regarding the correction control, performs control, based on a result of the calculation, such that a confirmation operation screen to confirm whether correction control is performed is displayed on the LCD display unit 21, accepts an operation on the confirmation operation screen via the operation unit 11, and determines whether correction control is performed, based on a result of the calculation depending on a result thus accepted.

According to such a configuration, in a state in which the suspension member 32 is attached to the attachment portion 31, and the case is suspended, the user can select whether calibration of the acceleration sensor 45 is performed with the present invention.

Moreover, in the manual calibration and the automatic calibration, when the suspension member 32 is attached to the attachment portion 31, and the case is suspended, it is preferable that the CPU 49 determines whether an inclination angle according to a value calculated by the acceleration sensor coincides with a predetermined inclination angle (reference value), and in a case of having determined that it does not coincide therewith, it is preferable that the CPU 49 calculates an amount of deviation from the predetermined inclination angle, calculates an average value of the amount of deviation and a plurality of amounts of deviation calculated in the past, and performs correction control based on the average value.

According to such a configuration, since calibration is performed based on an average value including the amounts of deviation calculated in the past with the present invention, bias unique to a place of performing calibration can be reduced, and a sense of discomfort is not given to the user in the operating feeling after the calibration.

For example, in a game or like in which the acceleration sensor 45 detects inclination of the cellular telephone device 1, and an animated image displayed on the LCD display unit 21 changes in accordance with a value of such detection, a sense of discomfort is given to the user unless the 0 g level of the acceleration sensor 45 is set to a level where the user usually operates. For example, in a case in which an animated image exhibits a sudden change that is different from usual although the user has inclined the cellular telephone device 1 with the usual operating feeling, the user will feel discomfort.

Here, in a case in which the place for performing calibration is different from the place where the user usually performs calibration, it is expected that the 0 g level after the calibration will be different from the usual 0 g level, due to the bias unique to the place. Since the user performs an operation of an inclination angle based on the 0 g level of the acceleration sensor 45 after the calibration that is performed at the usual place, if the 0 g level of the acceleration sensor 45 is different from the usual level, the user will feel discomfort in the operating feeling. On the other hand, in other applications, it may be required to calculate an accurate inclination angle by way of the acceleration sensor 45 in some cases.

Accordingly, in the cellular telephone device 1 according to the present invention, calibration is performed based on an average value of amounts of deviation calculated in the past; therefore, a sense of discomfort is not given to the user in the operation feeling of an inclination angle, and calculation of an accurate inclination angle can also be performed.

In addition, in the manual calibration and the automatic calibration, it is preferable that the CPU 49 performs correction control by considering the difference between the opened state and the closed state. If the weight balance is different between a case in which the cellular telephone device 1 is suspended by way of the suspension member 32 in the opened state, and a case in which the cellular telephone device 1 is suspended by way of the suspension member 32 in the closed state, it is necessary to change the calibration data depending on the state. Since the present invention can accommodate for the opened state and the closed state, accurate calibration can be performed regardless of the state of the cellular telephone device 1. It should be noted that, although it has been assumed in the present embodiment that the cellular telephone device 1 assumes the two states of the opened state and the closed state, it is not limited thereto, and a configuration may be employed so as to perform calibration by considering differences of various states.

Furthermore, the cellular telephone device 1 includes a memory card slot 51, and the weight balance changes by mounting a memory card in the slot. Accordingly, in the manual calibration and the automatic calibration, the CPU 49 may be configured so as to determine whether the memory card is mounted to the memory card slot 51, and the calculation of calibration changes between a suspended state when the memory card is mounted and a suspended state when the memory card is not mounted.

Moreover, in the manual calibration, when the user has performed an operation to command execution of correction control of a reference value of the acceleration sensor 45, it is preferable that the CPU 49 performs control such that the LCD display unit 21 displays information that prompts to suspend the case in any one of the opened state or the closed state (or any one of the state where the memory card is mounted or the state where the memory card is not mounted).

According to the present invention, in the manual calibration, since the state of the cellular telephone device 1 when performing calibration is instructed to the user utilizing the LCD display unit 21, it is not necessary to assume a plurality of states of the cellular telephone device 1 when performing calibration, and thus the processing load can be reduced.

Embodiment

Next, a description is provided regarding a specific method of performing calibration of the acceleration sensor 45 by way of the cellular telephone device 1 according to the present invention. It should be noted that it is assumed in the following that the suspension member 32 is attached to the attachment portion 31 of the cellular telephone device 1.

In a case in which the cellular telephone device 1 is not in use or the like, the user keeps it suspended from the pole 60 or the like by way of the suspension member 32. Subsequently, for example, in the automatic calibration, in a case in which the state of being suspended has continued for a predetermined period of time, calibration of three axial directions (x, y, z) including the gravity direction is performed. According to this method, deviation of the 0 g level due to temperature change or the like can be automatically corrected, and accurate acceleration data can always be obtained.

Figure 4:
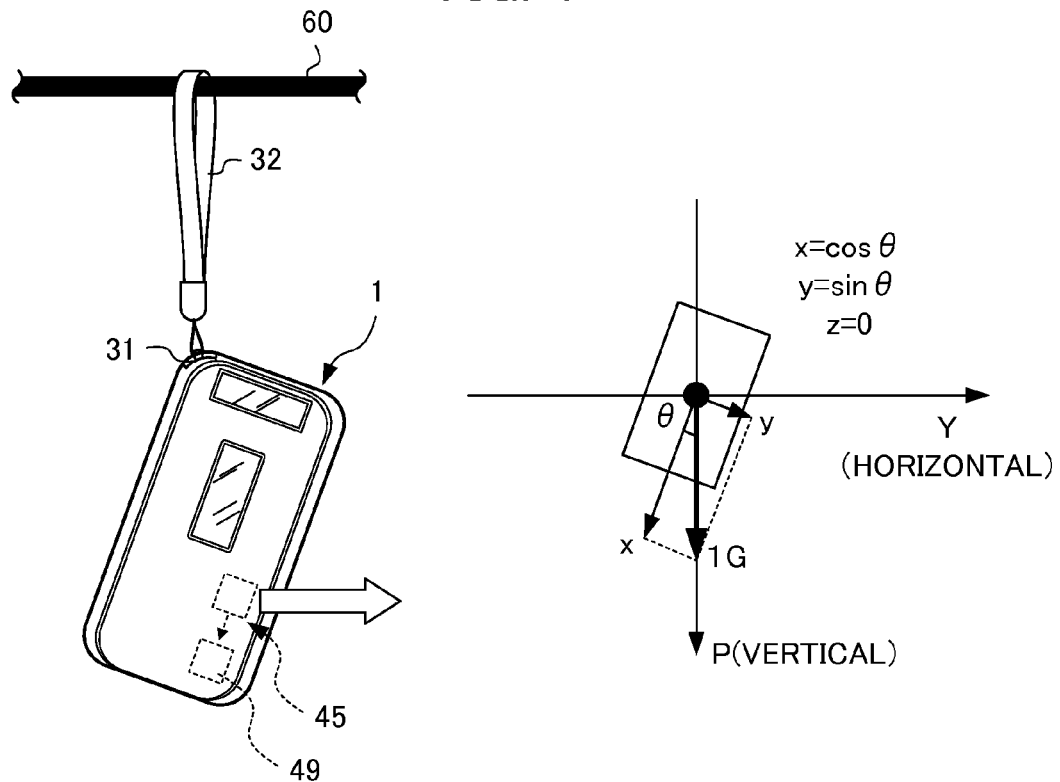
FIG. 4 is a view and diagram illustrating acceleration applied in each direction when the cellular telephone device according to the present invention is suspended by way of a suspension member.

FIG. 4 shows acceleration applied in each direction when the cellular telephone device 1 is suspended from the pole 60 or the like by way of the suspension member 32. It should be noted that, for the convenience of explanation, it is assumed in the following that a component in the z-axis direction is at a 0 g level in a state where the case is suspended by way of the suspension member 32 and has come to rest (naturally, there is also a case in which the component in the z-axis direction is not at the 0 g level depending on the position of attaching the suspension member 32). In addition, although acceleration applied in the x-axis direction, the y-axis direction, and the x-axis direction is different depending on the position attaching the suspension member 32 of the cellular telephone device 1, the fact that the 1 g level appears only in the vertical direction in the resting state does not change.

In the cellular telephone device 1, acceleration in the x-axis direction ($x=\cos\theta$), acceleration in the y-axis direction ($y=\sin\theta$), and acceleration in the z-axis direction ($z=0$) when the suspension member 32 is suspended from the pole 60 or the like are stored beforehand in the memory 44 or the like as expected values when performing calibration. At this time, it is possible to determine whether the terminal is suspended and has come to rest, by detecting a time when an absolute value of acceleration in the gravity direction (direction P in FIG. 4) becomes zero, from acceleration data of the x-axis direction, acceleration data of the y-axis direction, and acceleration data of the z-axis direction.

Here, the CPU 49 is monitoring acceleration for each axis of the acceleration sensor 45 and an inclination angle that is calculated. In addition, the CPU 49 determines whether the acceleration detected by the acceleration sensor 45 has entered a state that does not fluctuate, and the inclination angle that is calculated has entered a state of falling within a predetermined angle range. In a case in which it has been determined that they have entered such states, calibration is automatically performed in the automatic calibration. Here, the predetermined angle range is a range of values with some allowance for a value detected when the case is suspended in a state where the detection value of the acceleration sensor 45 is accurate. Furthermore, a state in which an inclination angle within this angle range is detected, and in which the acceleration does not fluctuate, can be identified as a state in which the case is suspended and has come to rest, even in a state in which minute deviation is occurring to a degree that the acceleration sensor requires calibration. In a case in which the CPU 49 has determined this state, calibration is automatically performed in the automatic calibration. In the usage state of the cellular telephone device 1, the cellular telephone device 1 is unlikely to be placed on a table at the same inclination angle as when the suspension member 32 is suspended from the pole 60 or the like; therefore, in the automatic calibration, calibration will not be performed in a state that is different from a state assumed in advance (a state of being suspended from the pole 60 or the like via the suspension member 32).

Moreover, in a situation where the cellular telephone device 1 is held in a hand of the user for operation and moving, there is a possibility that the inclination angle may approximate an inclination angle when being suspended from the pole 60 or the like via the suspension member 32, and the acceleration data may approximate the expected value. However, such a situation can be distinguished since fluctuation of acceleration in each axis continues to occur due to minute vibrations of the arm, and thus the situation is different from a situation of being suspended from the pole 60 or the like via the suspension member 32 and fixed.

In this way, in the automatic calibration with the present invention, a state of having come to rest and being stable such as a situation where the cellular telephone device 1 is suspended from the pole 60 or the like via the suspension member 32 is detected and calibration of the 0 g level of the acceleration sensor 45 is performed; therefore, accurate calibration can be performed with a simple method.

Cancellation Operation of Calibration

In the cellular telephone device 1 according to the present invention, in the manual calibration and the automatic calibration, when the cellular telephone device 1 is suspended from the pole 60 or the like via the suspension member 32, or after a predetermined period of time has elapsed since the cellular telephone device 1 was suspended from the pole 60 or the like via the suspension member 32, the acceleration sensor 45 detects acceleration data, and calibration processing of the 0 g level of the acceleration sensor 45 is executed.

Here, as described above, the absolute value of the acceleration in the vertical direction being "1" is assumed as the condition for performing calibration; however, strictly speaking, in the situation of being suspended from the pole 60 or the like via the suspension member 32, due to the performance of the acceleration sensor 45, a state of an accurate value "1" as acceleration data is not assumed, and minute changes will be repeated around the value "1".

In addition, at the 0 g level of the acceleration sensor 45 before performing calibration, there are many cases in which the user does not recognize the 0 g level as being deviated, and there is a possibility that the user is accustomed to the current 0 g level that has deviation. If calibration is automatically performed by way of the automatic calibration to correct the 0 g level of the acceleration sensor 45 in such a state, the user may feel discomfort in the operating feeling.

Therefore, according to the present invention, in a case in which the automatic calibration has been performed, the user is notified by way of sound, light, display, etc. of the fact that the calibration has been automatically performed, and in response to this notification, the user can determine whether the calibration should be adopted. In a case in which the calibration is not adopted, the user can cancel the calibration by performing a predetermined operation.

In this way, with the present invention, as long as the user is satisfied with the 0 g level before performing calibration, the user can use the cellular telephone device 1 with the 0 g level.

Furthermore, as described above, the user can determine whether a result of calibration by the automatic calibration should be employed with the present invention; therefore, in a case in which the automatic calibration is automatically performed when the user intentionally suspends the cellular telephone device 1 from the pole 60 or the like via the suspension member 32, or in a case in which the automatic calibration is automatically performed when a predetermined period of time has elapsed after the user intentionally suspended the cellular telephone device 1 from the pole 60 or the like via the suspension member 32, calibration can be prevented from being performed without being noticed by the user.

Method of Calculating Accurate 0 g Level

Next, a method of calculating an accurate 0 g level by way of averaging calibration data of the 0 g level is described hereinafter. According to the present invention, in the automatic calibration and the manual calibration, calibration of the 0 g level is performed in a case in which the absolute value of the acceleration in the vertical direction of the cellular telephone device 1 becomes "1"; however, since the acceleration in the gravity direction does not become an accurate value of "1" due to the characteristics of the acceleration sensor 45, a certain allowance is given to the acceleration data detected by the acceleration sensor 45.

Figure 5:
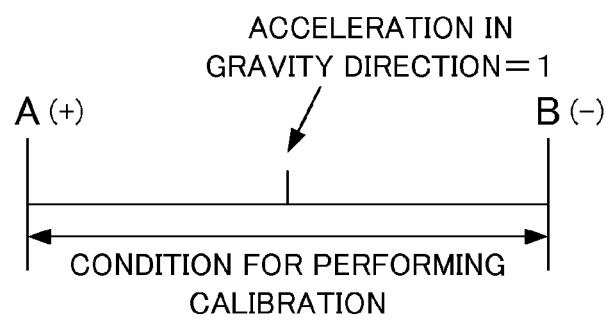
FIG. 5 is a diagram illustrating a calibration condition.

Here, a calibration condition is described using FIG. 5. As shown in FIG. 5, strictly speaking, the 0 g level after calibration is different between a case in which calibration is performed near "A" (+ direction) and a case in which calibration is performed near "B" (− direction); therefore, there is a possibility that the 0 g level serving as a reference may vary depending on the place or the like of performing calibration.

Therefore, according to the present invention, an average value of acceleration data is obtained each time calibration is performed, and calibration is performed based on this average value.

Consequently, with the present invention, by averaging the acceleration data, even if the place of performing calibration is a place that is different from usual, and the 0 g level is different from the value of calibration that is usually performed, it is possible to perform averaging with the acceleration data used (accumulated) for calibrations up to now; therefore, deviation of the reference value is reduced, and calibration can be performed with an accurate 0 g level that is not extremely biased.

Figure 6:
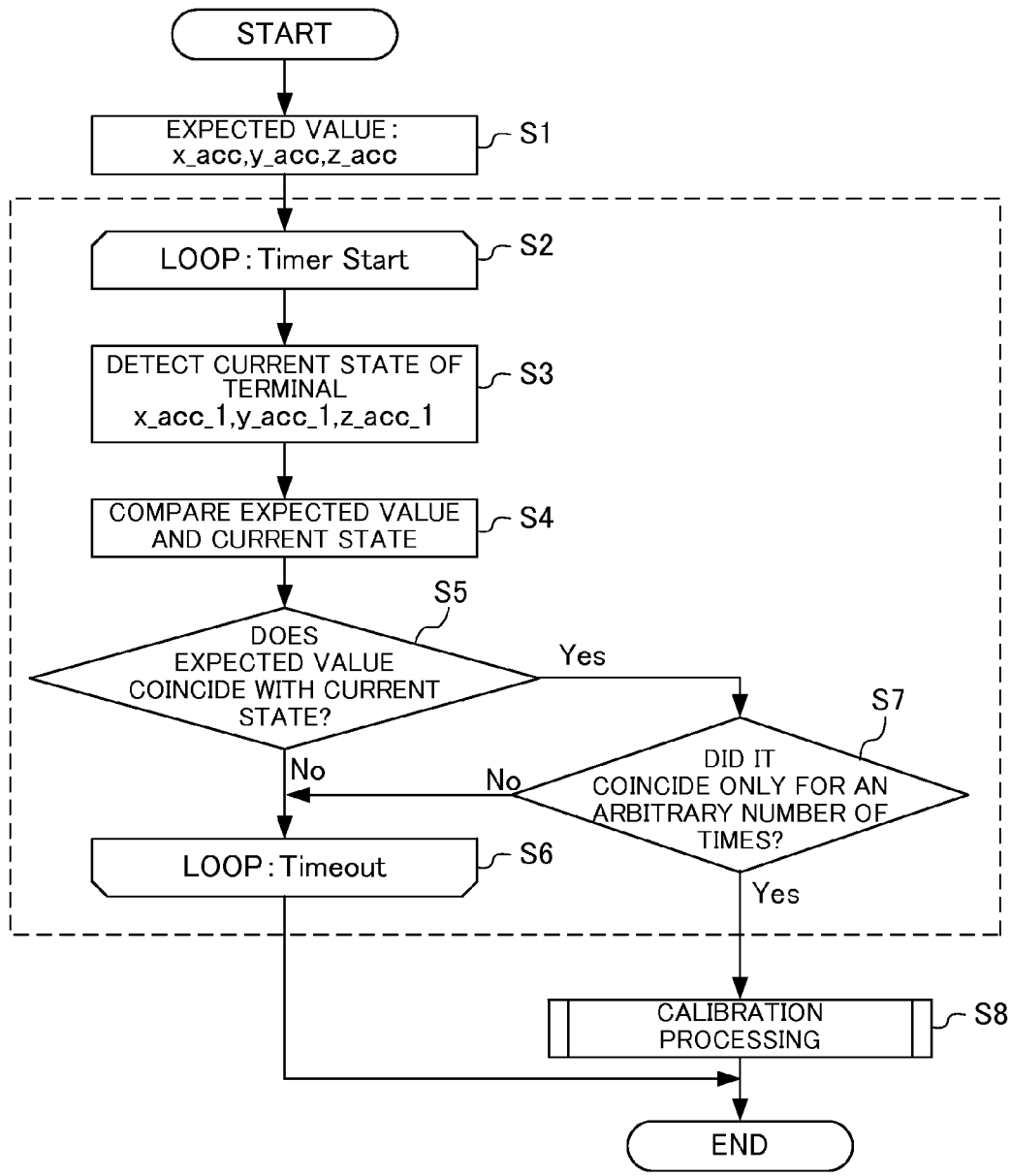
FIG. 6 is a flowchart illustrating a method of performing calibration.

Next, a method of performing calibration is described with reference to the flowchart shown in FIG. 6. It should be noted that the suspension member 32 is referred to as a strap in the following. Moreover, expected values are set in advance (Step S1). Here, setting of expected values is described. Acceleration in the x-axis direction (x_acc), acceleration in the y-axis direction (y_acc) and acceleration in the z-axis direction (z_acc) in a case in which the cellular telephone device 1 is suspended from the pole 60 or the like via a strap are measured in advance, and values thus measured are stored in the memory 44, etc. as expected values of the calibration condition. This is because a position for attaching the strap is different depending on the cellular telephone device 1, a result of which acceleration in the x-axis direction (x_acc), acceleration in the y-axis direction (y_acc) and acceleration in the z-axis direction (z_acc) in a case in which the cellular telephone device 1 is suspended from the pole 60 or the like are different. In addition, in Step S1, expected values in a state in which the strap of the cellular telephone device 1 in the opened state is suspended from the pole 60 or the like, or expected values in a state in which the strap of the cellular telephone device 1 in the closed state is suspended from the pole 60 or the like may be stored in the memory 44.

Next, the CPU 49 repeats each of Steps S3 to S6 until the timeout condition regarding the following Steps S3 to S6 is satisfied (Step S2).

The CPU 49 detects an inclination angle of the cellular telephone device 1 (Step S3). The CPU 49 calculates acceleration in the x-axis direction (x_acc_1), acceleration in the y-axis direction (y_acc_1) and acceleration in the z-axis direction (z_acc)_1, based on data provided from the acceleration sensor 45. It should be noted that, in the following, the acceleration in the x-axis direction (x_acc_1), the acceleration in the y-axis direction (y_acc_1) and the acceleration in the z-axis direction (z_acc)_1 are referred to as actual measurement values.

The CPU 49 compares the expected value stored in advance in Step S1 and the actual measurement values calculated in Step S3 for the respective axes (Step S4).

The CPU 49 determines whether a certain calibration condition is satisfied, based on a comparison result in Step S4 (Step S5). The case in which a certain calibration condition is satisfied refers to a case in which the expected values and the actual measurement values coincide with each other in all the axes, or fall within a certain range. In a case in which the certain calibration condition is satisfied (Yes), the processing advances to Step S6, and in a case in which the certain calibration condition is not satisfied (No), the processing advances to Step S7.

In a case in which the CPU 49 has determined that the certain calibration condition is satisfied in Step S5, the CPU 49 then confirms whether the determination has been obtained for an arbitrary number of times (Step S6). In other words, the CPU 49 is periodically monitoring detection values of the acceleration sensor 45, and determines whether such periodical detection results continuously satisfy the condition. A case may be assumed in which it is not possible to determine whether the cellular telephone device 1 is actually suspended from the pole 60 or the like via the strap only with the determination result in Step S5; therefore, this step is performed in order to confirm that the cellular telephone device 1 is actually suspended from the pole 60 or the like via the strap. It should be noted that this step is not essential, and may be skipped.

In Step S5 or S6, the CPU 49 determines whether a time t has been reached. It should be noted that the time t can be arbitrarily set, and is set as a time that is sufficient for allowing determination that the cellular telephone device 1 is suspended via the strap, and a time that is sufficiently longer than a plurality of cycle times of obtaining data of the acceleration sensor 45 (for example, 1 second). In a case in which the time t has been reached, the processing is terminated, and in a case in which the time t has not been reached, the processing is continued. It should be noted that, when the time t has been reached to terminate the processing (timeout), the user may be notified of the fact that the calibration processing has not been performed via sound, light, display, etc.

Furthermore, in a case in which it has been determined that a certain calibration condition is satisfied in Step S5, or in a case in which it has been determined for a plurality of times that the certain calibration condition is satisfied in Step S6, the CPU 49 performs calibration.

Since the calibration condition has some allowance in performing calibration as describe above, there is a possibility that an accurate 0 g level cannot be calculated. Accordingly, calibration accuracy may be enhanced by averaging the 0 g level for each calibration processing. Moreover, by enabling the calibration processing or cancelling the calibration processing, confirmation with the user may be made as to whether the previous state is acceptable, via sound, light, display, etc.

In addition, although the processing has been described above as being performed simultaneously in the x-axis direction, the y-axis direction and the z-axis direction, it is not limited thereto, and a configuration may be employed in which processing is separately performed in each axis direction, and in a case in which it has been determined that any one axis direction does not satisfy a certain calibration condition in Step S5, calibration is not performed.

Furthermore, although an embodiment has been described by giving an example of a cellular telephone device as an example of the small-sized electronic device with a built-in inclination sensor, the present invention is not limited thereto. For example, a small-sized electronic device such as a portable gaming machine, a portable navigation device and a PDA may be applicable as long as an inclination sensor is built therein and a holding angle is required to be detected. Moreover, since application to a digital camera may include a case in which an inclination sensor is built therein for camera shake correction when taking pictures or for assisting in photographing, etc., calibration of such an inclination sensor can be easily and accurately performed by applying the present invention thereto.

Other Embodiments

Furthermore, the present invention is not limited to the small-sized electronic device that can operate alone as described above, and the effects according to the present invention can be achieved also when applied to a small-sized electronic device (for example, a controller of a gaming machine) incorporating the acceleration sensor 45 and being used by being connected to an external device that does not have portability.

Figure 7:
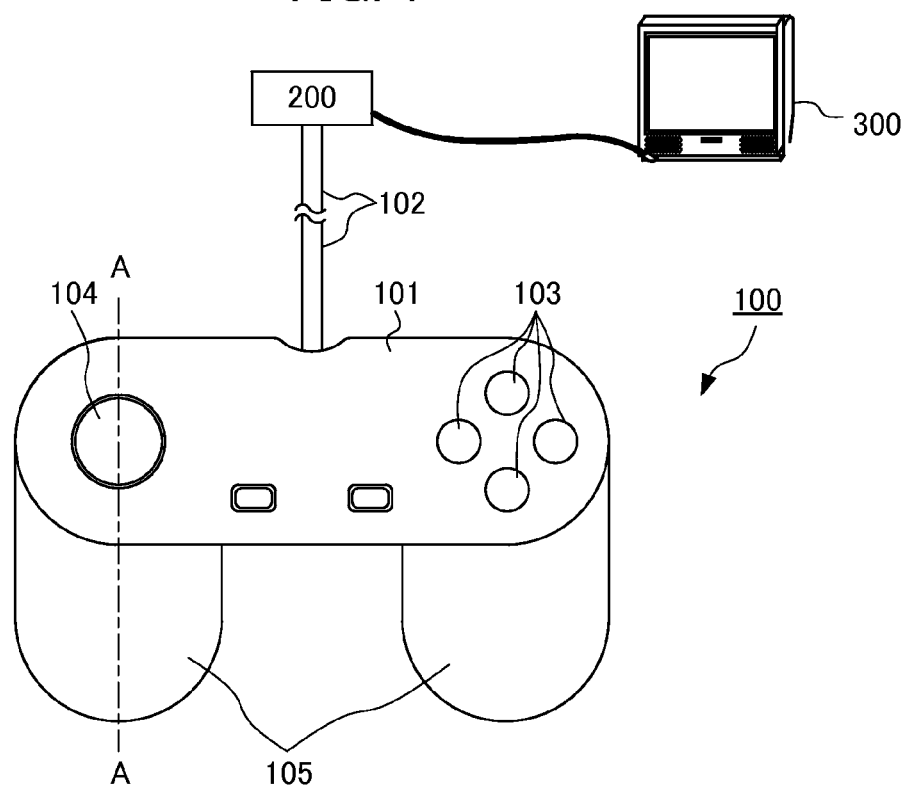
FIG. 7 is a view showing an appearance of a controller according to the present invention.

As shown in FIG. 7, a controller 100 includes: the acceleration sensor 45 (inclination sensor) that calculates inclination based on detected acceleration; a case 101 that incorporates the acceleration sensor 45; and a communication cable part 102 that outputs a signal according to a calculation value in the acceleration sensor 45 to outside of the housing. According to such a configuration, for the acceleration sensor 45, when the case 101 is suspended via the communication cable part 102, correction control of a reference value is performed based on a state of being suspended and having come to rest. It should be noted that the configuration and behavior of the acceleration sensor 45 are similar to those described above.

Figure 8:
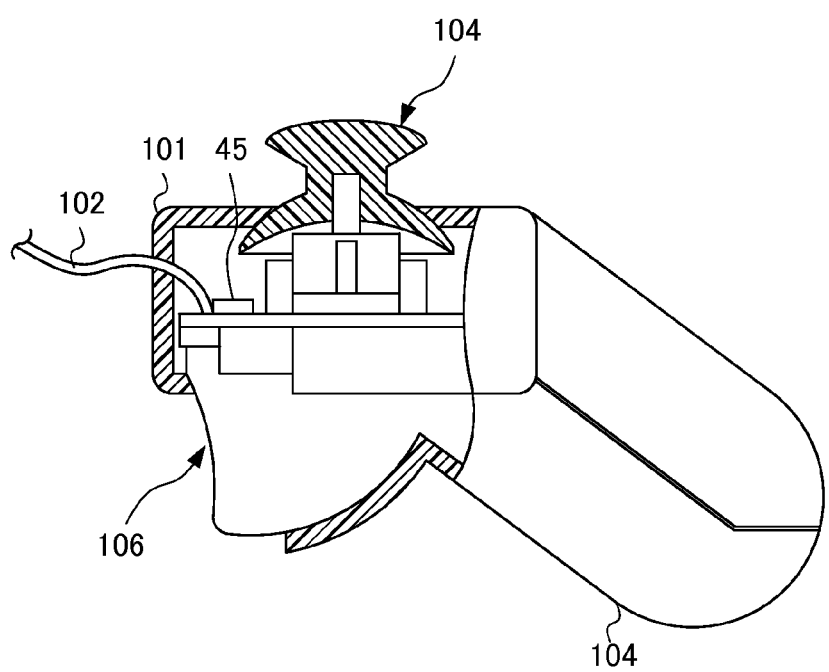
FIG. 8 is a cross-sectional view when sectioned along a line A-A in FIG. 7.
Figure 9:
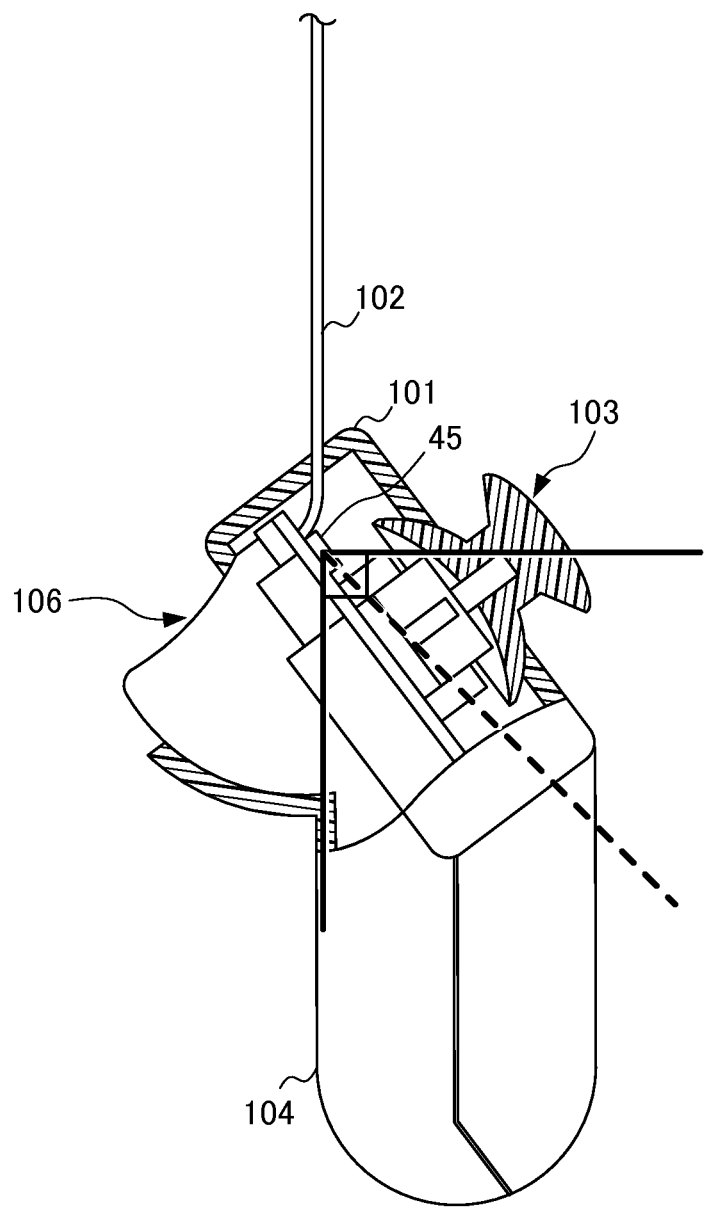
FIG. 9 is a view showing a state in which the case is suspended by way of a communication cable part when performing calibration.
Figures 10, 11:
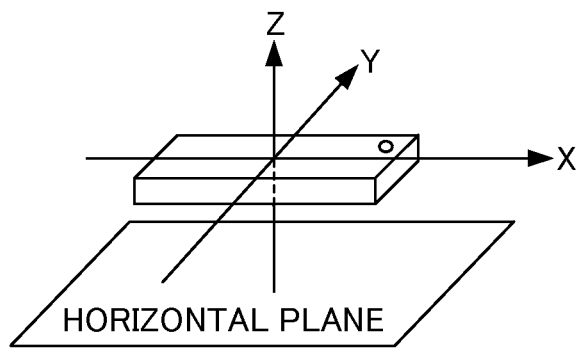
FIG. 10 is a diagram showing each axis direction of a three-axis acceleration sensor.
FIG. 11 is a table showing ranges of amounts of deviation of a 0 g level.
Figures 12A, 12B:
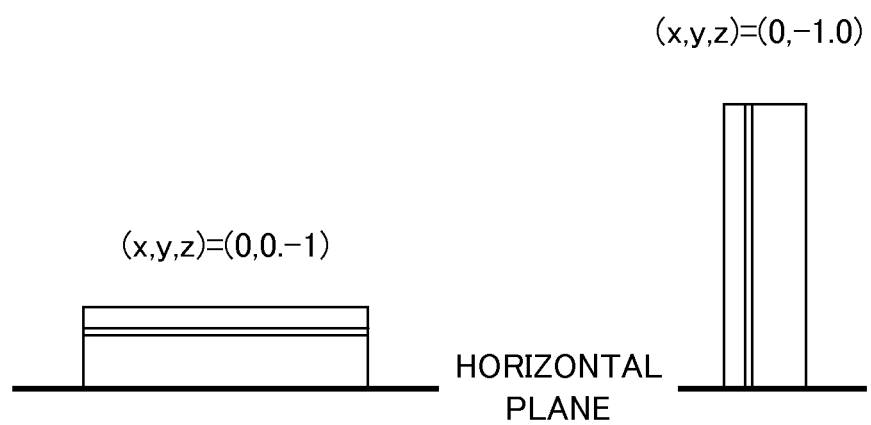
FIG. 12 is a diagram showing a conventional calibration method.

Here, FIG. 7 shows a top plan view of the controller 100; FIG. 8 shows a cross-sectional view when sectioned along a line A-A of FIG. 7; and FIG. 9 shows a state in which the case 101 is suspended via the communication cable part 102 when calibrating the acceleration sensor 45.

Moreover, the controller 100 includes: push switches 103 that perform a depression operation; a direction operation key 104 that performs a direction operation; grips 105; and levers 106. It should be noted that the configuration of the controller 100 is an example, and is not limited to the present embodiment.

In addition, calibration of the 0 g level of the acceleration sensor 45 is performed in a processing unit (not shown) of a main case 200 that is electrically connected to the controller 100 via the communication cable part 102. It should be noted that the calibration procedure to be performed by way of the processing unit of the main case 200 is similar to those performed by way of the CPU 49 as described above.

Furthermore, the main case 200 is connected to a monitor 300 that displays an image processed by a microcomputer in the main case. In addition, it is preferable that the display supporting calibration on the LCD display unit 21 as described above is similarly displayed on the monitor 300.

Therefore, according to the present invention, an accurate direction relative to gravity can be easily established when performing calibration of the acceleration sensor 45; therefore, for example, in a case in which deviation occurs in the 0 g level of the acceleration sensor 45 while the user is using the controller 100, by selecting the manual calibration, accurate calibration can be performed by the user oneself as many times as desired, and accurate acceleration data can always be obtained.

The invention claimed is:

1. An electronic device with a built-in inclination sensor, comprising:
    an inclination sensor that calculates inclination by a single detection of acceleration without using a magnetic field;
    a control unit that performs predetermined control based on a value calculated by the inclination sensor;
    a case that includes the inclination sensor and the control unit inside thereof; and
    a suspension portion that suspends the case,
    wherein the control unit performs correction control of a reference value of the inclination sensor based on a vertical direction determined by gravity and the value calculated by the single detection by the inclination sensor in a state in which the case is suspended by way of the suspension portion and has come to rest, thereby establishing the vertical direction,
    wherein when the case is suspended by way of the suspension portion, the control unit determines whether an inclination angle related to a value calculated by the inclination sensor coincides with a predetermined inclination angle, and
    in a case of having determined not to coincide, the control unit calculates an amount of deviation from the predetermined inclination angle, and performs the correction control based on the amount of deviation.

2. The electronic device with a built-in inclination sensor according to claim 1, wherein, when the case is suspended by way of the suspension portion, the control unit performs correction control of the reference value of the inclination sensor based on an inclination angle of the case relative to the vertical direction in a state of being suspended and having come to rest.

3. The electronic device with a built-in inclination sensor according to claim 1, further comprising:
    an operation unit; and
    a display unit that displays predetermined information,
    wherein, when an operation to perform correction control of a reference value of the inclination sensor is performed via the operation unit, the control unit performs control such that the display unit displays information that prompts to suspend the case by way of the suspension portion.

4. The electronic device with a built-in inclination sensor according to claim 3, wherein, when an operation to perform the correction control is performed via the operation unit, the control unit performs the correction control after a predetermined period of time has elapsed since the operation.

5. The electronic device with a built-in inclination sensor according to claim 3,
    wherein the case includes a first case and a second case that are connected so as to be openable and closable via a connecting portion, and
    wherein, when an operation to command execution of correction control of a reference value of the inclination sensor is performed via the operation unit, the control unit performs control such that the display unit displays information that prompts to suspend the case in any one of an opened state or a closed state.

6. The electronic device with a built-in inclination sensor according to claim 1, further comprising:
    an operation unit; and
    a display unit that displays information,
    wherein, when an operation to perform correction control of a reference value of the inclination sensor is performed via the operation unit, the control unit performs a predetermined calculation regarding the correction control, performs control such that the display unit displays a screen for confirming whether to perform the correction control based on a result of the calculation, and accepts a confirmation operation via the operation unit, and determines whether to perform the correction control based on the result of the calculation depending on a result thus accepted.

7. The electronic device with a built-in inclination sensor according to claim 1, wherein, in the case of having determined not to coincide, the control unit calculates an amount of deviation from the predetermined inclination angle, calculates an average value of the amount of deviation and a plurality of amounts of deviation calculated previously, and performs the correction control based on the average value.

8. The electronic device with a built-in inclination sensor according to claim 1,
    wherein the case includes a first case and a second case that are connected so as to be openable and closable via a connecting portion, and
    wherein the control unit performs the correction control taking into account whether the case is in an opened state or a closed state.

9. The electronic device with a built-in inclination sensor according to claim 1, wherein a strap is attached as a suspension member to the suspension portion.

10. The electronic device with a built-in inclination sensor according to claim 1,
    wherein the case further includes a memory card mounting portion to which a memory card can be removably mounted, and
    wherein the control unit performs the correction control taking account of the existence of a memory card mounted to the memory card mounting portion.

11. The electronic device with a built-in inclination sensor according to claim 1,
    wherein the inclination sensor is configured so as to calculate inclination by detecting acceleration, and
    wherein the control unit monitors acceleration detected by the inclination sensor and an inclination angle that is calculated, and performs the correction control in a case of having determined that the acceleration detected by the inclination sensor is in a state that does not fluctuate, and that the inclination angle that is calculated falls within a predetermined angle range with the vertical direction as a reference.

12. The electronic device with a built-in inclination sensor according to claim 1,
wherein the inclination sensor is configured so as to calculate inclination by detecting acceleration, and
wherein the control unit performs the correction control or processing related to the correction control in a state in which acceleration detected by the inclination sensor does not fluctuate.

13. An electronic device with a built-in inclination sensor, comprising:
an inclination sensor that calculates inclination by a single detection of acceleration without using a magnetic field;
a case that incorporates the inclination sensor; and
a communication cable part that outputs a signal related to a value calculated by the single detection by the inclination sensor to an external device,
wherein correction control of a reference value is performed in the inclination sensor based on a vertical direction determined by gravity and the value calculated by the single detection by the inclination sensor in a state in which the case is suspended by way of the communication cable part and has come to rest, thereby establishing the vertical direction,
wherein when the case is suspended by way of the suspension portion, the control unit determines whether an inclination angle related to a value calculated by the inclination sensor coincides with a predetermined inclination angle, and
in a case of having determined not to coincide, the control unit calculates an amount of deviation from the predetermined inclination angle, and performs the correction control based on the amount of deviation.

14. A method of correcting a reference value of an inclination sensor in an electronic device with a built-in inclination sensor, including the inclination sensor and a case accommodating the inclination sensor inside thereof, the method comprising:
detecting inclination by way of the inclination sensor by a single detection of acceleration without using a magnetic field;
performing correction control of a reference value of the inclination sensor based on a vertical direction determined by gravity and the value calculated by the single detection by the inclination sensor in a state in which the case is suspended by way of the suspension portion and has come to rest, thereby establishing the vertical direction;
determining, when the case is suspended by way of the suspension portion, whether an inclination angle related to a value calculated by the inclination sensor coincides with a predetermined inclination angle;
calculating, in a case of having determined not to coincide, an amount of deviation from the predetermined inclination angle; and
performing the correction control based on the amount of deviation.

* * * * *